United States Patent Office 3,346,349
Patented Oct. 10, 1967

3,346,349
DISPROPORTIONATION OF SILICONHALIDES
William A. Harding, Morton, and Harold Shalit, Drexel Hill, Pa., assignors to Air Products and Chemicals, Inc., a corporation of Delaware
No Drawing. Filed Oct. 2, 1961, Ser. No. 142,021
13 Claims. (Cl. 23—366)

ABSTRACT OF THE DISCLOSURE

Disproportionation of organosiloconhalides is effected with a catalyst prepared by treating an aluminaceous base with a silane compound.

---

Cross-reference to related application

This application is a continuation-in-part of Ser. No. 107,645, filed May 4, 1961, and now U.S. Patent No. 3,207,699.

The present invention relates to disproportionation of silicon halides, especially organosiliconhalides with particular emphasis on the production of desired dialkyl dihalosilanes, more importantly dimethyldichlorosilane.

Background of the invention

Dichlorosilanes have become increasingly important as starting materials for production of silicone resins. Dimethyldichlorosilane, which is among the more widely used of such silane compounds, is prepared industrially by reaction of methyl chloride with a silicon-copper alloy at elevated temperature. As by-products accompanying the dimethyldichlorosilane there are also obtained by this or other methods various other organosilane compounds including methyltrichlorosilane. The disproportionation of methyltrichlorosilane and of other organochlorosilanes with aluminum chloride catalyst has been previously described. This operation is conducted in a static system under pressure and at temperatures of >300° C. In an attempt to obtain favorable yields of the desired dichlorosilane at relatively mild conditions it has also been suggested to employ catalysts derived from aliphatic amines. Here again a static system was employed involving either extended refluxing or agitation for lengthy periods at elevated pressures.

Summary of the invention

In accordance with the present invention a novel catalytic system for disproportionation of organosiliconhalides is provided which is capable of producing favorable yields of rearranged chlorosilane products in a continuous flow reaction, without necessitating the use of super atmospheric pressure. The catalyst employed is an absorbent solid aluminaceous base having associated therewith, by being chemically combined or chemisorbed thereon, an organosilane compound or a halosilane.

Description of the preferred embodiments

The preferred solid adsorbent base is a silica-alumina catalyst of the type having at least moderate cracking activity and containing 25 to 95% $SiO_2$ by weight of the catalyst (water-free basis). The cracking activity of a catalyst can be measured by a standard test known as Cat-A, described by J. Alexander and H. G. Shimp, National Petroleum News, Aug. 2, 1944, page R537, and Proc. Am. Petr. Inst. III, 27, 51 (1947). The preferred catalysts of the silica-alumina type employed as the solid base used in preparing catalysts for practice of the invention, are those having a Cat-A activity of at least 15. Other solid adsorbents that can be employed include porous aluminas such as activated alumina or better grades of bauxite of low iron content, or alumina associated with other refractory metal oxides such as zirconia.

Activation of the solid adsorbent catalyst base is effected by incorporation therein (by chemi-sorption or chemical combination) of at least 0.1 mole and up to 10 moles of organosilicon or halosilane compound per liter of the solid. Such incorporation of the silane compound is effected by first heating granules of the adsorbent solid to remove water from the surface. This drying generally requires conditions at least as severe as heat treatment for an hour at 400° C.; at lower temperatures more time is needed. Use of flowing gas and evacuation facilitate the drying. The halosilane or organosilane compound in vapor form is then passed through the dried solid adsorbent granules. During the initial reaction between the solid adsorbent and the silane compound there is evidenced a distinct temperature rise which moves zone-wise through the catalyst bed; hydrogen and/or methane (depending on the silane compound employed) is evolved as a non-condensible gas. After continued passage of the organo- or halosilane vapors through the catalyst bed converted silicon compounds appear in the off gas, indicating that the catalyst is active for the desired disproportionation of organosiliconhalides.

For the activation of the catalyst by the organosilane or halosilane one may employ compounds of the formula:

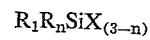

in which $R_n$ and $R_1$ represent hydrogen or short chain alkyl groups of 1 to 5 carbon atoms, X is halogen and $n$ is a whole number from 0 to 3; at least one of the substituents on Si being halogen or alkyl.

Among the representative organosilane compounds of the above formula useful in producing desired catalyst for practice of the invention there are included:

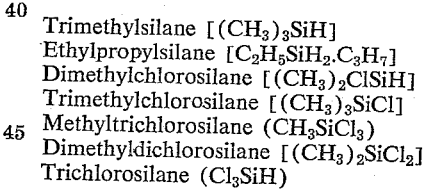

The initial treatment for preparation or activation of the catalyst may employ an organosilane of the same structure and composition as that which is subsequently to be used as charge in the disproportionation reaction, but is not restricted thereto. The activation step and the disproportionation may be carried out in the same reactor without disturbing the pretreated catalyst. A distinct temperature rise which moves zonewise through the bed accompanies the activation of the catalyst during the pretreatment. When the high temperature zone has passed completely through the catalyst bed the catalyst is conditioned for the disproportionation reaction. If the organosilane or halosilane employed for activation of the catalyst is different from that intended to be used as charge for disproportionation, the flow of activating vapor may be then discontinued and replaced by the intended charge, with or without temperature adjustment. The activation step is preferably carried out at temperatures of 100 to 600° C.; for the disproportionation reaction temperatures in the range of 200 to 600° C. are preferred.

Example I

A synthetic silica-alumina catalyst containing 87.5% SiO₂ and having a Cat-A activity of 38 was heated to 510° C. and evacuated for at least 2 hours then purged with nitrogen for about 2 hours. The reactor employed contained a layer of the silica-alumina catalyst and had separate layers of inert granular material (fused silica) above and below the catalyst layer. Before introducing the reactor charge, hot gases for purging were passed downwardly through these beds and discharged. During the subsequent on-stream period the effluent gas from the reactor was passed through several cooling zones to a gas collection container. These cooling zones were cooled respectively by water, and solid carbon dioxide. Only gases not condensed at −80° C. accumulated in the gas collection container. Products condensed in the Dry Ice trap were recovered as liquid, which was analyzed by distillation or by infra-red spectroscopy.

(A) After purging the catalyst bed as above described, trichlorosilane was run in at the rate of .36 mole per hour per liter of catalyst bed. A distinct temperature rise was observed and hydrogen appeared in the gas collection bottle. During this initial treating stage no silicon containing compounds appeared in the effluent.

With continued passage of the trichlorosilane through the catalyst bed at the same rate, disproportionated product was found in the reactor effluent, comprising dichlorosilane and tetrachlorosilane. The condensed liquid reaction product containing these compounds was analyzed by gas phase infra-red spectroscopy. The concentration of dichlorosilane in the collected liquid product was 6.5 mole percent.

Other runs were made with trichlorosilane charge in the same reactor employing silica-alumina catalyst of 65 Cat-A activity, (B) at 588° C. and 0.48 hourly charge rate (moles/l.); and (C) at 477° C. at an hourly charge rate of 1.08 moles. In each of these instances the concentration of dichlorosilane in the product was less than that in the previous run (A).

Example II

A run was made on methyl dichlorosilane over silica-alumina catalyst of 65 Cat-A activity under the general procedure described in Example I above, operating at an average temperature of 510° C. and at an hourly charge rate of 4.2 moles l. The condensed reaction products in the effluent were fractionally distilled and cuts collected at (1) up to 36° C., (2) 36 to 51° C., and (3) 51 to 80° C., concentrated respectively in dichlorosilane (B.P. 8° C.), methyldichlorosilane (B.P. 42° C.) and dimethyldichlorosilane (B.P. 72° C.). It was found that over 57% of the organosilane product was composed of disproportioned material of which about 65% was the desired dimethyldichlorosilane.

The unconverted methyldichlorosilane, with or without the dichlorosilane, can be recycled to the reactor for further disproportionation to desired products.

Example III

A run was similarly made charging trimethyl chlorosilane at the hourly rate of 3.12 moles/liter, over silica-alumina catalyst of 38 Cat-A activity. During the initial step of activating the catalyst, the non-condensible gas collected consisted substantially entirely of methane.

The condensed products in the reaction effluent were fractionally distilled, collecting cuts concentrated respectively in tetramethylsilane, unconverted trimethylchlorosilane (B.P. 57° C.) and in dichlorodimethylsilane. The condensed effluent contained about 21.4% of disproportionated products.

Example IV

To determine the effect of continuous running time over the same catalyst on yield, trimethylchlorosilane was charged over the catalyst described and at the conditions specified in Example III over an extended period of over 5 hours. Product distribution at various intervals was shown in the following table.

TABLE I

| Time of Collection, Min. | Product Distribution | | | | | |
|---|---|---|---|---|---|---|
| | $(CH_3)_3SiCl$ | | $(CH_3)_2SiCl_2$ | | $(CH_3)_4Si$ | |
| | Min. | Max. | Min. | Max. | Min. | Max. |
| 75-95 | 48.9 | 52.6 | 12.1 | 13.1 | 31.0 | 33.5 |
| 180-195 | 52.3 | 53.9 | 12.3 | 12.7 | 32.3 | 33.4 |
| 300-310 | 52.1 | 57.5 | 9.3 | 10.4 | 28.8 | 31.9 |

The preparation of organosilane activated solid adsorbent catalyst is described in part in our copending application Ser. No. 107,645, filed May 4, 1961, now U.S. Patent No. 3,207,699, of which the present application is a continuation-in-part. In said prior application the activity of these catalysts in the disproportionation of alkyl silanes is demonstrated. The covalent bond energy of Si—Cl (85.8 kcal./mole) is much greater than that of the Si—C bond (57.6 kcal./mole). Hence the extent of disproportionation with the haloalkyl silanes is not as extensive as when only silicon-carbon bonds are involved.

As was observed in the case of the trichlorosilane disproportionation (Example I) a temperature level is reached at which maximum disproportionation is achieved. At above such temperature level possibly the organosilane may be thermally decomposed rather than catalytically disproportioned. For disproportionation of trimethyl chlorosilane the preferred temperature range appears to be between 475 and 525° C. at hourly charge rates of 0.5 to 5 moles/liter.

In any method for disproportionation of chlorosilanes the yield of the desired product is necessarily limited by the characteristic statistical distribution of the various chlorosilane compounds at equilibrium. The advantage of the present continuous process lies in the fact that the redistribution reaction need not be carried to completion. The desired dimethyldichlorosilane can be readily separated from the product (for example by fractional distillation) and the unconverted material recycled to the disproportionating reaction. Suitable fresh charge material for the reaction to obtain the desired dimethyldichlorosilane could be the mixture of methylchlorosilanes remaining after removal of desired dimethyldichlorosilane from the reaction product obtained by passing methyl chloride over a heated silicon alloy. This mixture prior to fractionation would include, besides the dimethyldichlorosilane, also methyltrichlorosilane, and trimethylchlorosilane.

While the invention has been described with particular emphasis on disproportionation of a methylated chlorosilane composition to obtain dimethyldichlorosilane, it will be understood that the same process is applicable to other alkyl halosilanes, particularly those of the formula

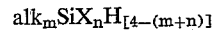

$$alk_mSiX_nH_{[4-(m+n)]}$$

in which X is halogen, "alk" is an alkyl group containing 1 to 5 carbon atoms and $m$ and $n$ are whole numbers from 1 to 3, their total not exceeding 4.

Obviously many modifications and variations of the invention as hereinbefore set forth may be made without departing from the spirit and scope thereof, and therefore only such limitations should be imposed as are indicated in the appended claims.

What is claimed is:

1. The method of disproportionating organosilicon halides having the formula $alk_mSiX_nH_{[4-(m+n)]}$ in which X is halogen, alk is an alkyl group of 1 to 5 carbon atoms, $m$ is a whole number from 1 to 3, $n$ is a whole number from 1 to 3 and wherein the total of $m$ and $n$ does not exceed 4, which method comprises: continuously passing the same over a solid catalyst at a temperature in the range of 200–600° C. and collecting the resulting disproportionated product, the method of preparing said catalyst consisting essentially of drying aluminaceous granules at a temperature of at least 400° C. and treating the dried granules with a silane compound having the formula $R_1R_nSiX_{(3-n)}$ in which $R_n$ and $R_1$ are independently selected from the group consisting of hydrogen and alkyl groups having 1 to 5 carbon atoms, X is halogen, $n$ is a whole number from 0 to 3 and wherein at least one of the substituents of Si is halogen or alkyl, thereby incorporating 0.1 to 10 mols of the silane compound per liter of said dried granules.

2. The method as defined in claim 1 wherein said silane compound is a halo silane.

3. The method of claim 2 wherein the silane compound is methyltrichlorosilane.

4. The method according to claim 1 wherein said organosiliconhalides comprise an admixture of methyltrichlorosilane and trimethylchlorosilane.

5. The method as defined in claim 1 wherein said aluminaceous granules are silica-alumina cracking catalysts of moderate cracking activity.

6. The method of claim 5 wherein the silica-alumina cracking catalysts are of at least 15 Cat-A activity.

7. The method of disproportionating an organosiliconhalide having the formula $alk_mSiX_nH_{[4-(m+n)]}$ in which X is halogen, alk is an alkyl group of 1 to 5 carbon atoms, $m$ is a whole number from 1 to 3, $n$ is a whole number from 1 to 3 and wherein the total $m$ and $n$ does not exceed 4, which method comprises: passing the same over a solid catalyst at an hourly rate of 0.3 to 5 mols per liter of catalyst and at a temperature of 200–600° C., the method of preparing said catalyst consisting essentially of drying silica-alumina granules of at least moderate cracking activity at a temperature of at least 400° C. and treating the dried granules with a silane compound having the formula $R_1R_nSiX_{(3-n)}$ in which $R_n$ and $R_1$ are independently selected from the group consisting of hydrogen and alkyl groups having 1 to 5 carbon atoms, X is halogen, n is a whole number from 0 to 3 and wherein at least one of the substituents of Si is halogen or alkyl, thereby incorporating 0.1 to 10 mols of the silane compound per liter of said dried granules.

8. The method as defined in claim 7 wherein said organosilicon halide is trimethylchlorosilane.

9. The method as defined in claim 7 wherein a fraction boiling in the range of dichlorodimethylsilane is recovered as a product of the disproportionation reaction and at least one of the other organosiliconhalide reaction products from such reaction is recycled and passed over the catalyst.

10. The method of disproportionating trichlorosilane for the production of products including dichlorosilane, which method comprises passing the trichlorosilane over catalysts at a temperature of 200–600° C., the method of preparing said catalyst consisting essentially of drying aluminaceous granules at a temperature of at least 400° C. and treating the dried granules with a silane compound having the formula $R_1R_nSiX_{(3-n)}$ in which $R_n$ and $R_1$ are independently selected from the group consisting of hydrogen and alkyl groups having 1 to 5 carbon atoms, X is halogen, $n$ is a whole number from 0 to 3 and wherein at least one of the substituents of Si is halogen or alkyl thereby incorporating 0.1 to 10 mols of the silane compound per liter of said dried granules.

11. The method for obtaining dimethyldichlorosilane which comprises disproportionating organosiliconhalides having the formula $alk_mSiX_nH_{[4-(m+n)]}$ in which X is halogen, alk is an alkyl group of 1 to 5 carbon atoms, $m$ is a whole number from 1 to 3, $n$ is a whole number from 1 to 3 and wherein the total of $m$ and $n$ does not exceed 4, which method comprises: continuously passing the same over a solid catalyst at a temperature in the range of 200–600° C., preventing the disproportionation reaction from going to completion and separating the desired dimethyldichlorosilane from the product of the disproportionation reaction, the method of preparing said catalyst consisting essentially of drying aluminaceous granules at a temperature of at least 400° C. and treating the dried granules with a silane compound having the formula $R_1R_nSiX_{(3-n)}$ in which $R_n$ and $R_1$ are independently selected from the group consisting of hydrogen and alkyl groups having 1 to 5 carbon atoms, X is halogen, $n$ is a whole number from 0 to 3 and wherein at least one of the substituents of Si is halogen or alkyl, thereby incorporating 0.1 to 10 mols of the silane compound per liter of said dried granules.

12. The method as defined in claim 11 wherein the product of the disproportionation reaction includes methyldichlorosilane and trimethylchlorosilane.

13. The method as defined in claim 11 wherein the dimethyldichlorosilane is separated from the disproportionation reaction product by fractional distillation.

References Cited

UNITED STATES PATENTS

| | | | |
|---|---|---|---|
| 2,627,451 | 2/1953 | Erickson et al. | 23—14 |
| 2,695,893 | 11/1954 | Houdry | 252—463 |
| 2,717,257 | 9/1955 | Bluestein | 260—448.2 |
| 2,722,504 | 11/1955 | Fleck | 250—448.2 |
| 2,921,033 | 1/1960 | Houdry | 252—463 |
| 2,982,719 | 5/1961 | Gilbert et al. | 252—463 |
| 3,207,699 | 9/1965 | Harding et al. | 252—430 |

MILTON WEISSMAN, *Primary Examiner.*

MAURICE A. BRINDISI, M. N. MELLER, *Examiners.*